United States Patent
Guckenberger et al.

(10) Patent No.: US 11,767,938 B2
(45) Date of Patent: Sep. 26, 2023

(54) COMPRESSION NUT OR FITTING WITH REMOVABLE PLUNGER FOR EASILY DISLODGING STUCK FERRULES

(71) Applicant: Thermo Finnigan LLC, San Jose, CA (US)

(72) Inventors: George B. Guckenberger, Austin, TX (US); Adam D. Bryant, Austin, TX (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 17/443,530

(22) Filed: Jul. 27, 2021

(65) Prior Publication Data

US 2023/0029511 A1 Feb. 2, 2023

(51) Int. Cl.
*F16L 19/02* (2006.01)
*F16L 19/025* (2006.01)
*G01N 30/60* (2006.01)
*G01N 30/16* (2006.01)

(52) U.S. Cl.
CPC ......... *F16L 19/0225* (2013.01); *F16L 19/025* (2013.01); *G01N 30/6026* (2013.01); *G01N 30/16* (2013.01)

(58) Field of Classification Search
CPC ..... F16L 19/061; F16L 19/06; F16L 19/0225; F16L 19/046; G01N 30/6026; G01N 30/16
See application file for complete search history.

(56) References Cited

U.S. PATENT DOCUMENTS

| | | | | | |
|---|---|---|---|---|---|
| 2,696,395 | A | * | 12/1954 | Ellis | F16L 19/046 |
| | | | | | 285/344 |
| 3,216,748 | A | * | 11/1965 | Gunberg | F16L 19/06 |
| | | | | | 285/55 |
| 3,973,792 | A | * | 8/1976 | Gonner | G01N 30/6026 |
| | | | | | 285/356 |
| 4,991,883 | A | * | 2/1991 | Worden | G01N 30/6026 |
| | | | | | 285/348 |
| 5,163,722 | A | * | 11/1992 | Worden | F16L 37/242 |
| | | | | | 285/348 |
| 5,595,406 | A | * | 1/1997 | Warchol | F16L 39/00 |
| | | | | | 285/422 |
| 6,102,449 | A | * | 8/2000 | Welsh | F16L 19/07 |
| | | | | | 285/332 |
| 10,119,638 | B2 | * | 11/2018 | Pa | G01N 30/6026 |
| 10,184,921 | B2 | * | 1/2019 | Neal | G01N 30/6026 |
| 10,731,779 | B2 | * | 8/2020 | Takemoto | G01N 30/6026 |
| 2014/0375050 | A1 | * | 12/2014 | Zeko | G01N 30/6004 |
| | | | | | 285/317 |
| 2015/0285414 | A1 | * | 10/2015 | Tomida | G01N 30/6026 |
| | | | | | 285/389 |
| 2022/0228681 | A1 | * | 7/2022 | Tolley | G01N 30/6026 |

* cited by examiner

*Primary Examiner* — David Bochna (57) ABSTRACT

A compression fitting includes a nut with a threaded end for receiving a threaded tube and a receiving end for holding a plunger head; and a plunger with an inner bore for receiving a capillary tube and the plunger head for engaging a ferrule positioned within the receiving end between the plunger head and the threaded tube, the plunger slidingly engaged with the nut to force the ferrule from the nut.

15 Claims, 7 Drawing Sheets

COMPRESSION NUT OR FITTING WITH REMOVABLE PLUNGER FOR EASILY DISLODGING STUCK FERRULES

FIELD

The present disclosure generally relates to the field of gas chromatography including a compression nut or fitting with a removable plunger for easily dislodging stuck ferrules.

INTRODUCTION

Gas chromatography (GC) is a useful technique for analyzing volatile compounds of a sample. A GC column having a retention medium or stationary phase can be used to separate the volatile compounds based on their affinity to the retention medium. The time it takes a compound to traverse the column (retention time) is compound dependent as compounds with higher affinity for the stationary phase can be retained in the column for a longer period of time than compounds that have limited interactions with the stationary phase.

As the mobile phase is a gas (typically helium, hydrogen, or nitrogen), it is necessary to ensure gas tight connections between the column and a sampling device, such as an injector, at one end and a detector at the other end. Typically, connecting the column involves installing a ferrule onto the column, trimming the end of the column to remove any damage or contamination caused by installing the ferrule and positioning the end of the column at an optimal length for the sampling device or detector. The ferrule can be compressed and deformed to form a gas tight seal.

SUMMARY

In a first aspect, a compression fitting can include a nut with a threaded end for receiving a threaded tube and a receiving end for holding a plunger head; and a plunger with an inner bore for receiving a tube and the plunger head for engaging a ferrule positioned within the receiving end between the plunger head and the threaded tube. The plunger can be slidingly engaged with the nut to force the ferrule from the nut.

In various embodiments of the first aspect, the compression fitting can further include the threaded tube.

In various embodiments of the first aspect, the plunger head can include a tapered ferrule engagement surface.

In various embodiments of the first aspect, the threaded end of the nut can be a female threaded end for receiving the threaded tube internally.

In various embodiments of the first aspect, the plunger can have an interior bore for receiving a tube.

In various embodiments of the first aspect, the plunger can be removable from the nut.

In various embodiments of the first aspect, the plunger can include a retaining clip or device to retain at least a portion of the plunger within the nut.

In various embodiments of the first aspect, the nut can include a spring to bias the plunger towards the proximal end of the nut.

In various embodiments of the first aspect, the nut can include exterior facets for engagement with a tool for tightening and loosening the nut.

In various embodiments of the first aspect, the nut can include wings for finger tightening the nut.

In a second aspect, a method of operating a compression fitting can include disengaging a nut and a threaded tube, the nut including a threaded end for threadingly engaging the threaded tube and a receiving end for holding a plunger head of a plunger and a ferrule compressed between the plunger head and the threaded tube; and translating the plunger axially relative to the nut to dislodge the ferrule stuck within the nut or to the plunger head.

In various embodiments of the second aspect, the method can further include engaging the nut and threaded tube. In particular embodiments, engaging the nut and the threaded tube can include deforming the ferrule within the receiving end between the plunger head and the threaded tube to form a gas tight seal. In particular embodiments, the method can further include inserting a capillary tube through the plunger, nut, ferrule, and threaded tube before engaging the nut and the threaded tube. In particular embodiments, the engaging the nut and the threaded tube includes tightening the nut with a tool.

In various embodiments of the second aspect, disengaging the nut and the threaded tube can include loosening the nut with a tool.

In various embodiments of the second aspect, translating the plunger can include removing the plunger from the nut.

In various embodiments of the second aspect, translating the plunger can include translating the plunger until the plunger head extends past the threaded end of the nut. In particular embodiments, translating the plunger can include translating the plunger until a retention clip or device limits further movement of the plunger.

In various embodiments of the second aspect, the method can further include biasing the plunger towards the threaded end of the nut with a spring, the nut further including a spring-loaded portion, the spring positioned within the spring-loaded portion.

DRAWINGS

For a more complete understanding of the principles disclosed herein, and the advantages thereof, reference is now made to the following descriptions taken in conjunction with the accompanying drawings, in which.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of compression nuts or fittings with removable plungers for easily dislodging stuck ferrules.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Figure 1:
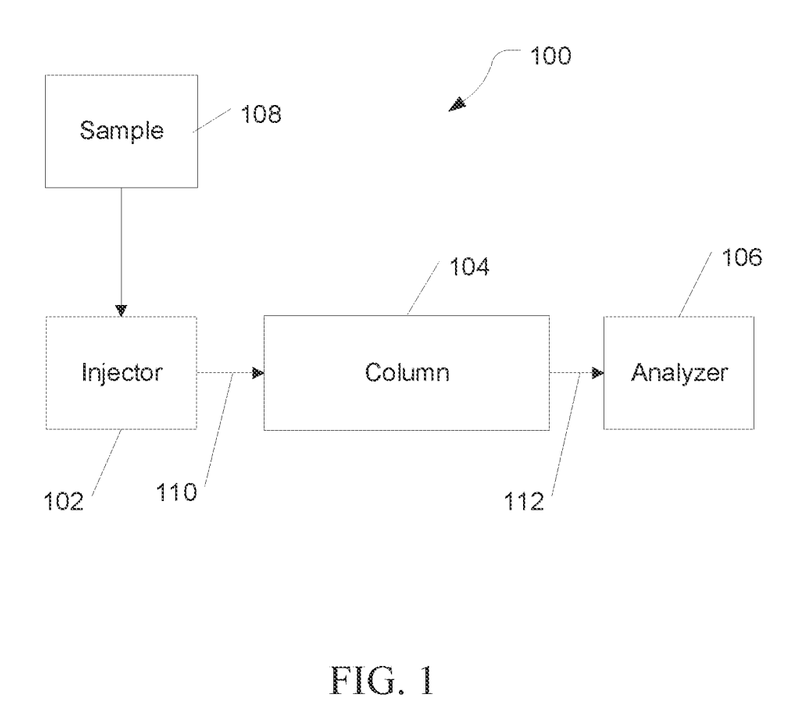
FIG. 1 is a diagram of an exemplary gas chromatography system.

FIG. 1 illustrates a typical gas chromatograph system 100. The system includes an injector 102, a column 104, and a detector 106. A sample 108 can be supplied to the injector 102. In various embodiments, the sample 108 can be a gaseous sample, such as for head space analysis. In other embodiments, the sample 108 can be a liquid sample and the injector can vaporize the liquid sample into a gaseous state. The sample can be moved from the injector to the column 104 by a carrier gas. The column 104 includes a retention medium, typically as a thin coating on the interior surface of the column 104. The retention medium can differentially retain some compounds from the vaporized sample such that the amount of time necessary to transit the column is compound dependent. In this way, the compounds in the vaporized sample can be separated based on the time to transit the column (retention time).

Upon exiting the column 104, the compounds can enter the detector 106.

Various detectors can be used as part of a GC system including flame ionization detectors, nitrogen phosphorous detectors, electron capture detectors, thermal conductivity detectors, flame photometric detectors, mass spectrometers, and the like.

The injector 102 can be coupled to the column 104 with connector 110 and column 104 can be coupled to the detector 106 by connector 112. In various embodiments, connectors 110 and 112 can be compression fittings in which a ferrule is installed onto column 104 and deformed to form a seal to prevent leaks.

When ferrules are compressed, they can sometimes become stuck on one part that they are compressed against, or they expand into a portion of the compression nut/fitting and cannot be easily removed. It can be difficult to remove a ferrule stuck to the compression nut to reuse the compression nut or remove the mated parts. In some prior art a slot is made in the nut and a wire or other small tool may be used to pry out a stuck ferrule. In other prior art, a hole is made in the nut or compression fitting that allows access to pry out the stuck ferrule.

In various embodiments, a nut to be used in compression fittings can include a removable plunger that can be pushed out of the nut/fitting along with the stuck ferrule to make it easy to eject or dislodge a ferrule that gets stuck on the sealing surface or inside the nut. In some implementations, a spring and backstop may be designed to eject the stuck/lodged ferrule from the cylindrical guide. In other implementations there is no spring or the spring does not help to eject the ferrule. The plunger can push the ferrule from the nut through the region in which it can be lodged.

Figure 2A:
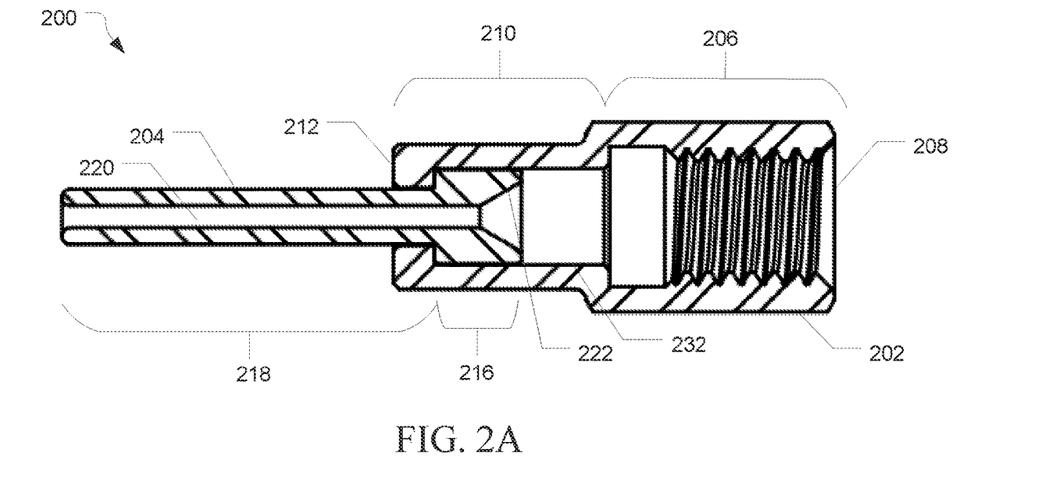
FIG. 2A is a cross-section view of an exemplary column connector, in accordance with various embodiments.
Figure 2B:
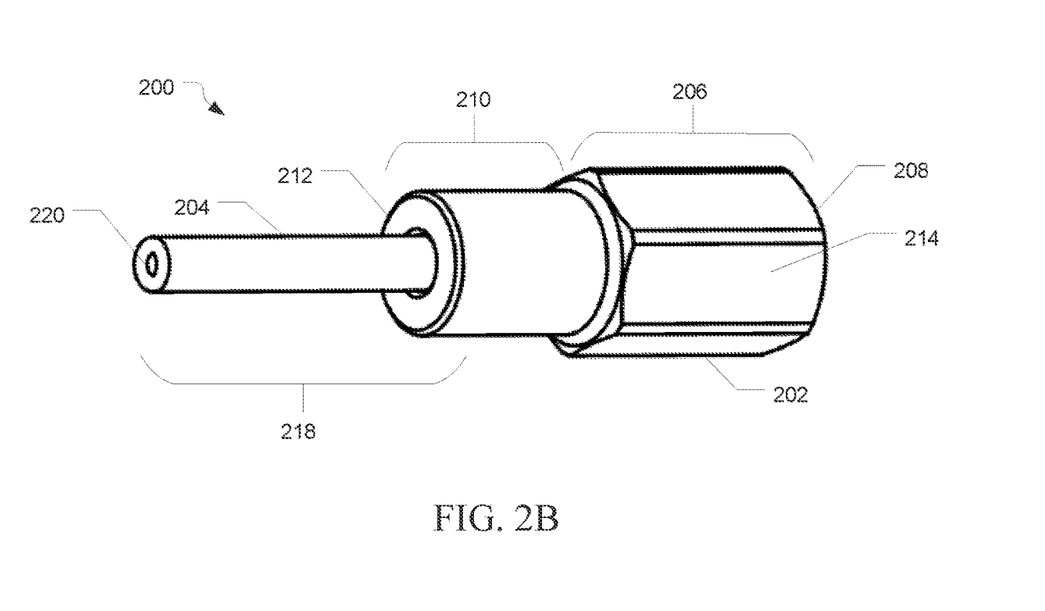
FIG. 2B is a perspective view of an exemplary column connector, in accordance with various embodiments.
Figure 2C:
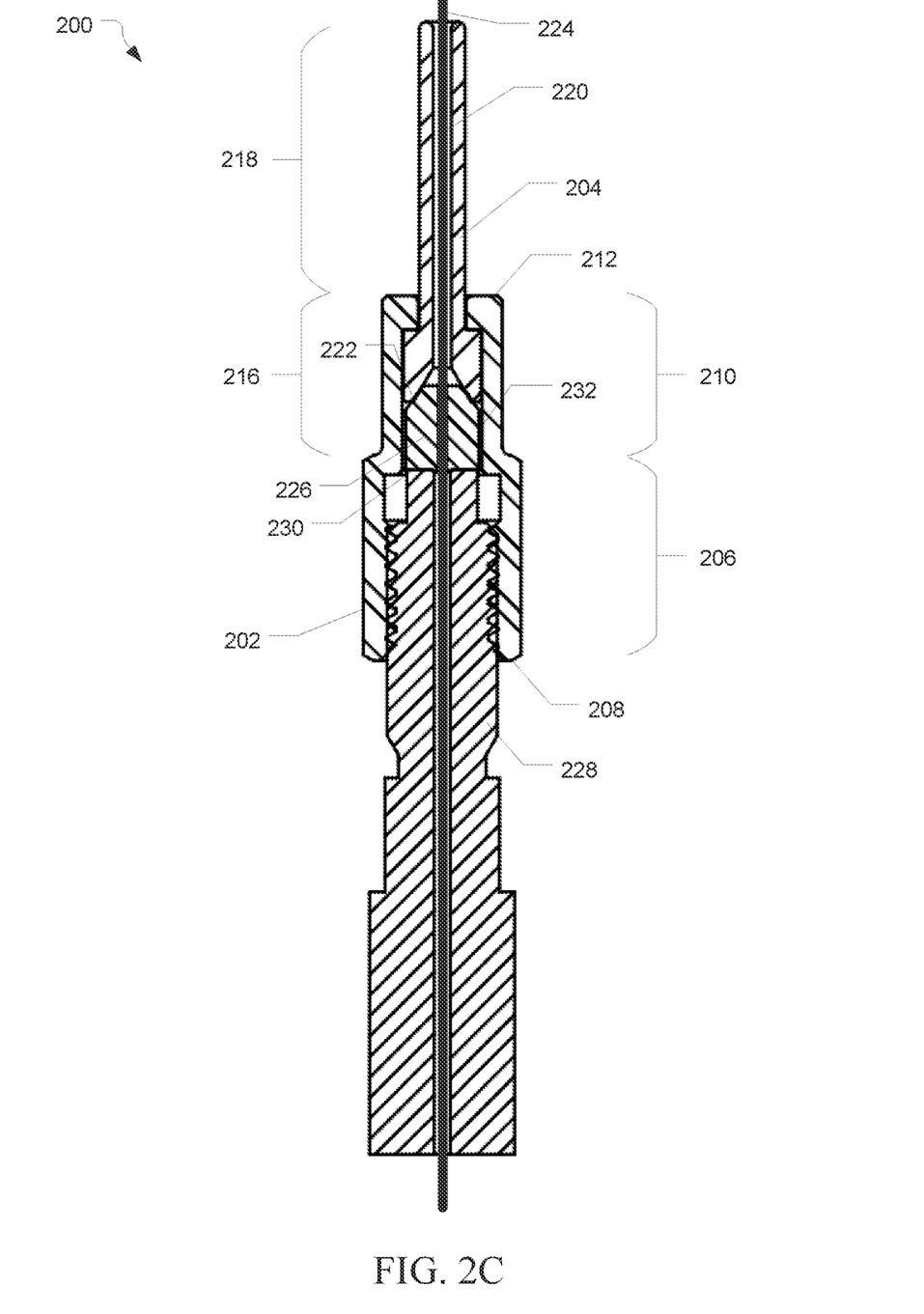
FIG. 2C is a cross section view of an exemplary column connector, in accordance with various embodiments.

FIGS. 2A, 2B and 2C illustrate an exemplary compression fitting 200.

The compression fitting can include a compression nut 202 with a removable plunger 204.

The compression nut 202 can include a threaded portion 206 at a proximal end 208 and a receiving portion 210 at a distal end 212. The exterior surface 214 of the threaded portion 206 can be faceted for engagement with a tool, such as a wrench or pliers, to tighten/loosen the compression nut 202.

The plunger 204 can include a plunger head 216, a plunger shaft 218, and a hollow bore 220 extending the length of the plunger 204. The plunger head 216 can include a ferrule engagement surface 222. In various embodiments, the ferrule engagement surface 222 can be tapered to receive a tapered end of a ferrule. In other embodiments, the ferrule engagement surface 222 can be flat. Generally, the ferrule engagement surface 222 can be complementary to the shape of a ferrule 226. The plunger head 216 can be sized to fit within the receiving portion 210 of the nut 202 with minimal lateral movement but to slide easily in an axial direction. The bore 220 can be sized and shaped to receive a capillary tube, such as a gas chromatography column or a transfer line.

In various embodiments, when fully assembled, as shown in FIG. 2C, a capillary tube 224 can be inserted through the plunger 204, the nut 202, the ferrule 226, and a threaded tube 228. The threaded tube can include a ferrule engagement surface 230. The ferrule engagement surface 230 of the threaded tube 228 can have various shapes, such as flat as shown or have a tapered similar to the ferrule engagement surface 222 of the plunger 204. Other shapes are possible to be complementary to the shape of the ferrule 226.

The ferrule 226 can be positioned within the receiving portion 210 of the nut 202 and the threaded tube 228 can be threadingly engaged with the threaded portion 206 of the nut 202. Tightening the nut 202 against the threaded tube 228 can compress the ferrule 226 between the ferrule engagement surface 230 of the threaded tube 228 and the ferrule engagement surface 222 of the plunger 204. In various embodiments, compression of the ferrule 226 can cause a deformation of the ferrule 226 to form a gas tight engagement between the ferrule 226 and the capillary tube 224 and between the ferrule 226 and ferrule engagement surface 230 of the threaded tube 228. Additionally, the ferrule may form a tight contact with an interior surface 232 of the receiving portion 210 of the nut 202 and the ferrule engagement surface 222 of the plunger 204.

In various embodiments, when the nut 202 is disengaged from the threaded tube 228, the ferrule 226 may remain stuck to one or more of the surfaces. For example, the ferrule may become stuck inside the nut 202. The plunger 204 can be pushed towards the proximal end 208 of the nut 202 to remove the ferrule 226. In another example, the ferrule 226 may become stuck on ferrule engagement surface 222 of the plunger 204, which again may be removed with the ferrule 226 through the proximal end 208 of the nut 202, which would allow access to the ferrule 226 to dislodge it from the ferrule engagement surface 222 of the plunger 204.

In various embodiments, the plunger 204 can be removable from the nut 202 by advancing the plunger 204 though the proximal end 208 of the nut 202. In other embodiments, at least a portion of the plunger 204 can be retained within the nut 202 through the use of a retaining clip. The retaining clip can prevent the plunger 204 from being completely withdrawn from the nut. The retaining clip can be positioned such that at least a portion the plunger head 216 can be extended out of the proximal end 208 of the nut 202.

Figure 3A:
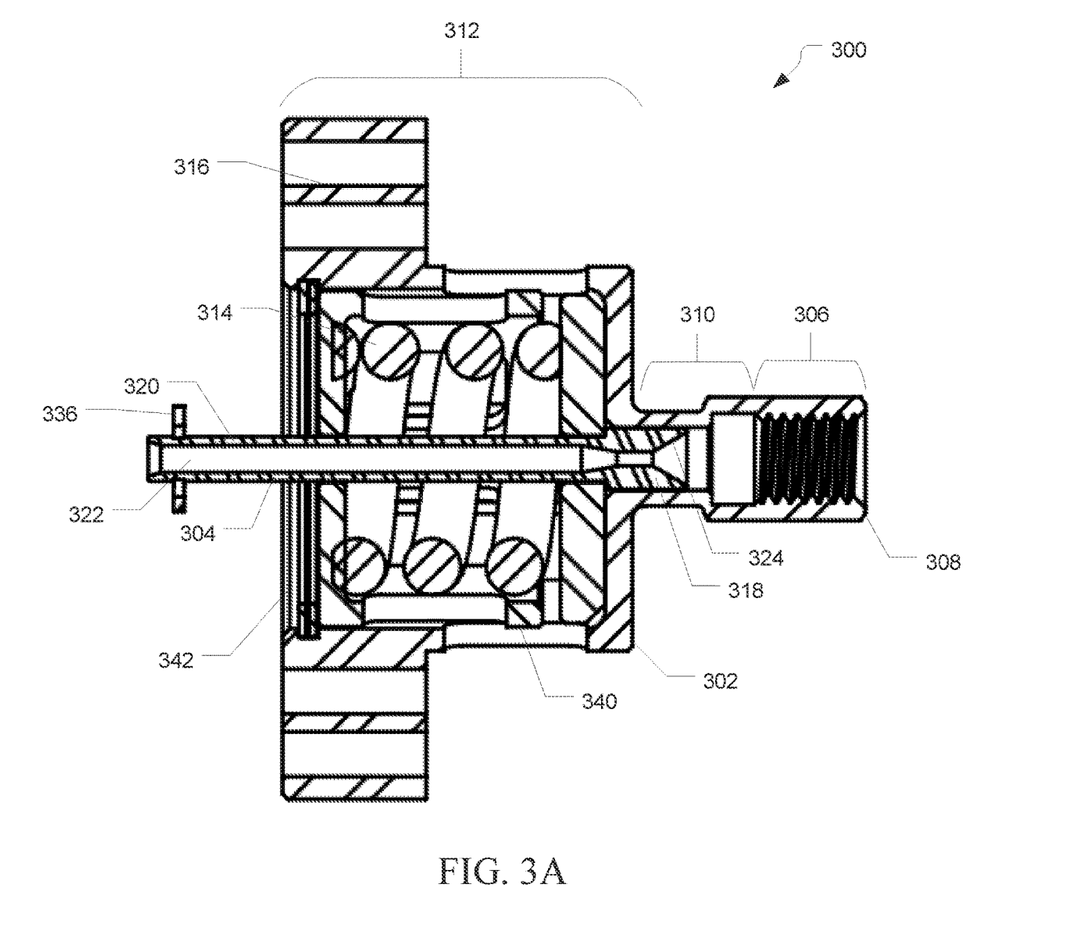
FIG. 3A is a cross section view of an exemplary column connector with a column, in accordance with various embodiments.
Figure 3B:
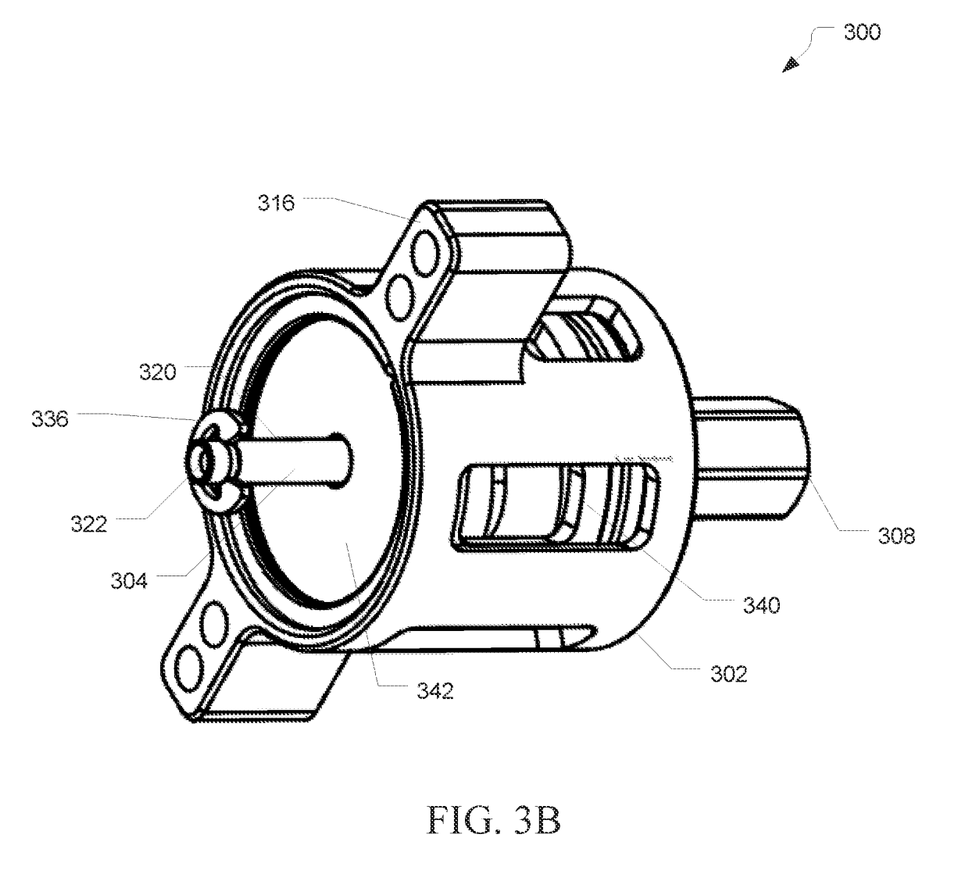
FIG. 3B is a perspective view of an exemplary column connector, in accordance with various embodiments.

FIGS. 3A and 3B illustrate an alternate embodiment of a compression fitting 300 with a spring-loaded nut 302 and a plunger 304.

The spring-loaded nut 302 can include a threaded portion 306 at a proximal end 308 and a receiving portion 310. The compression nut can further include a spring-loaded portion 312 housing a spring 314. Additionally, the spring-loaded portion 312 can include wings 316. The wings 316 can provide a surface for finger engagement while tightening the spring-loaded nut 302.

The plunger 304 can include a plunger head 318, a plunger shaft 320, and a hollow bore 322 extending the length of the plunger 304. The plunger head 318 can include a ferrule engagement surface 324. In various embodiments, the ferrule engagement surface 324 can be tapered to receive a tapered end of a ferrule. In other embodiments, the ferrule engagement surface 324 can be flat to receive a flat end of a ferrule. Generally, the shape of the ferrule engagement surface 324 can be complementary to the shape of the ferrule. The plunger head 318 can be sized to fit within the receiving portion 310 of the nut 302 with minimal lateral movement but to slide easily in an axial direction. The bore 322 can be sized and shaped to receive a capillary tube, such as a gas chromatography column or a transfer line.

Figure 3C:
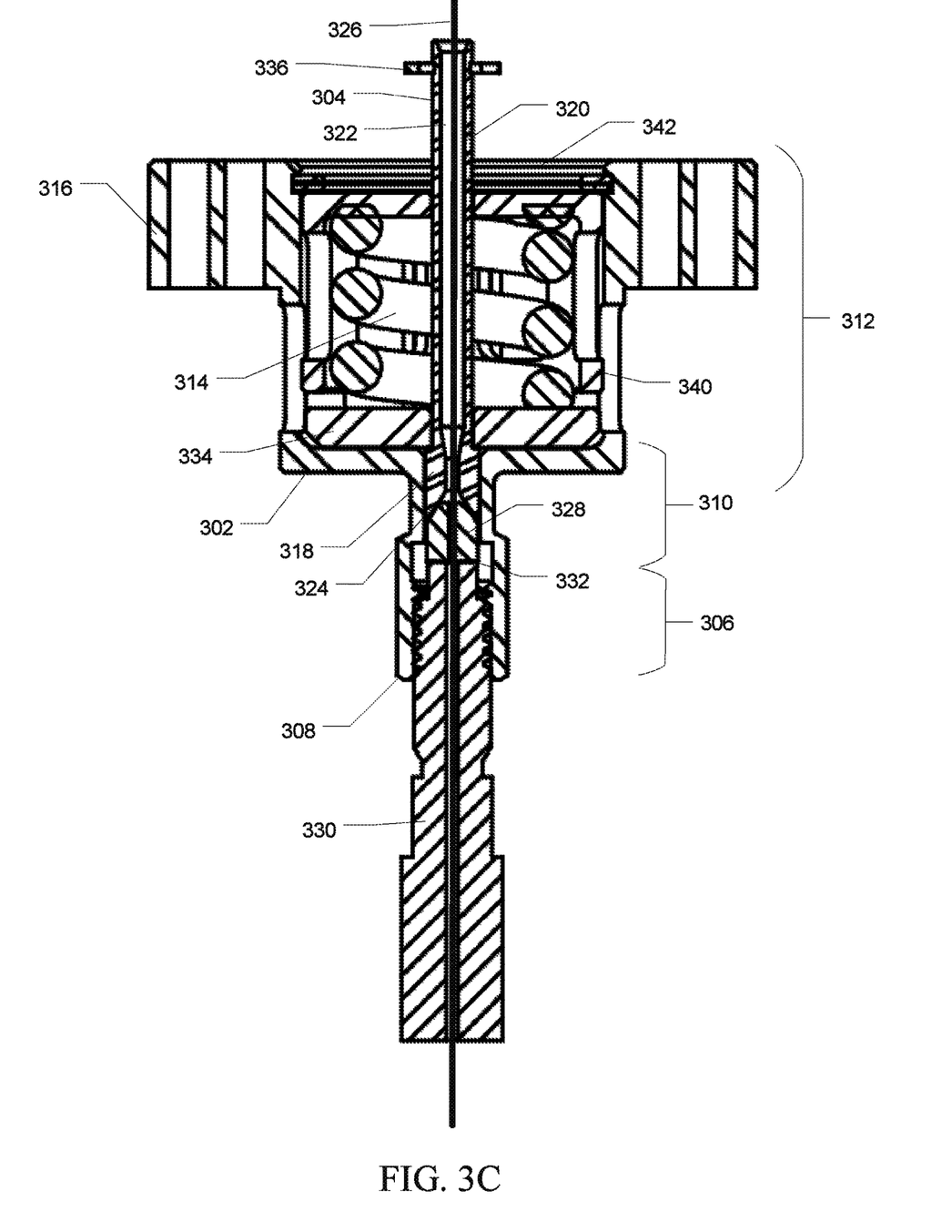
FIG. 3C is a cross section view of an exemplary column connector, in accordance with various embodiments.

In various embodiments, when fully assembled, as shown in FIG. 3C, a capillary tube 326 can be inserted through the plunger 304, the nut 302, a ferrule 328, and a threaded tube 330. The threaded tube 330 can include a ferrule engagement surface 332 to press against the ferrule 328. Generally, the shape of the ferrule engagement surface 332 can complementary to the ferrule 328, such as flat as shown or tapered similar to the ferrule engagement surface 324 of the plunger head 318.

The ferrule 328 can be positioned within the receiving portion 310 of the nut 302 and the threaded tube 330 can be threadingly engaged with the threaded portion 306 of the nut 302. Tightening the nut 302 against the threaded tube 330 can compress the ferrule 328 between a ferrule engagement surface 332 of the threaded tube 330 and the ferrule engagement surface 324 of the plunger 304.

In various embodiments, when the nut 302 is disengaged from the threaded tube 330, the ferrule 328 may remain stuck to one or more of the surfaces. For example, the ferrule may become stuck inside the nut 302. The plunger 304 can be pushed towards the proximal end 308 of the nut 302 to remove the ferrule 328. In another example, the ferrule 328 may become stuck on ferrule engagement surface 324 the plunger 304. The plunger 304 can be translated axially relative to the nut 302 at least until the plunger head 318 exits the proximal end 308 of nut 302 with the ferrule 328 allowing access to the ferrule 328 to dislodge it from the ferrule engagement surface 324 of the plunger 304.

In various embodiments, the plunger 304 may move against the backstop 334 and the spring 314. When removing the nut, the spring 314 may push the plunger 304 towards the ferrule 328 and help to eject the used ferrule 328.

In various embodiments, a retaining clip 336 can prevent the plunger 304 from being completely withdrawn from the nut. In various embodiments, the retaining clip 336 can be positioned such that at least a portion the plunger head 318 can be extended out of the proximal end 308 of the nut 302. In other embodiments, the plunger 304 can be removable from the nut 302 without a retaining clip or device.

In various embodiments, the spring-loaded portion 312 can further include a spring travel limit retainer 340 and a retaining clip 342. The spring travel limit retainer 340 can limit the compression of the spring 314 ensuring the ferrule 328 is compressed between the ferrule engagement surface 324 of the plunger 302 and the ferrule engagement surface 332 of the threaded tube 330. Spring 314 can then bias the backstop 334 and plunger 304 towards the threaded tube 330 to provide pressure on the ferrule 328 to maintain the seal as the ferrule 328 continues to deform at high temperature.

Figure 4:
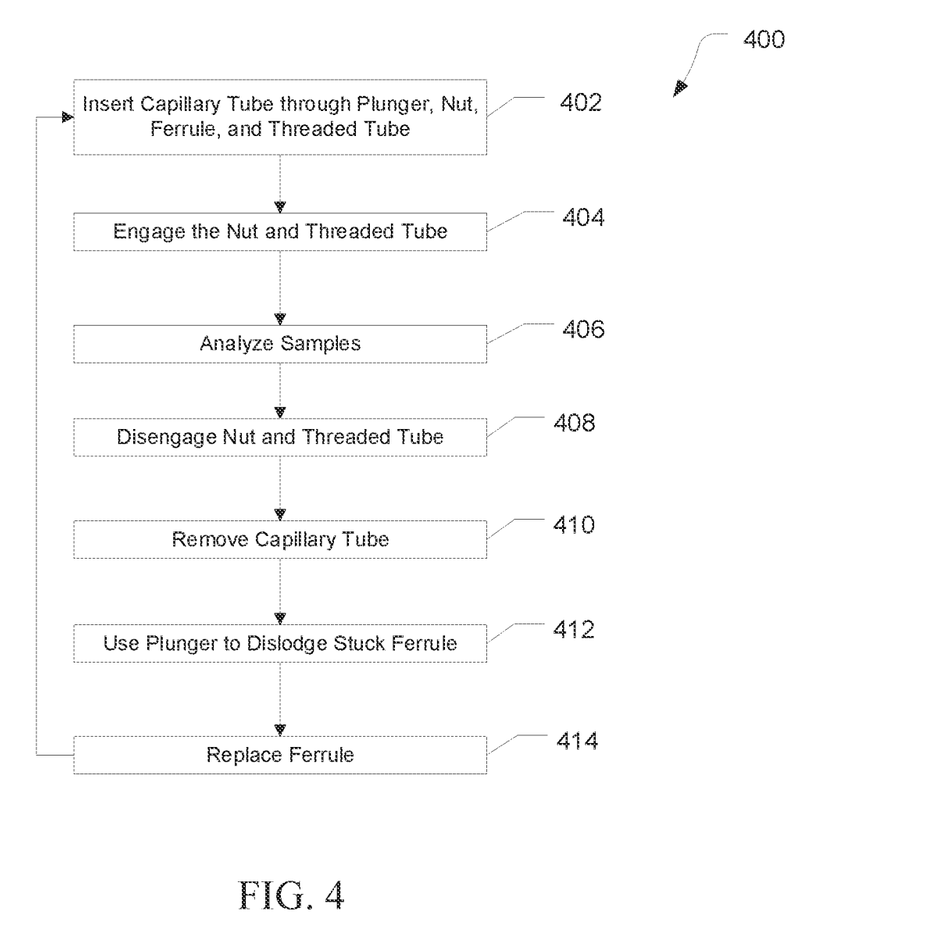
FIG. 4 is a flow diagram illustrating a method of using a column connector, in accordance with various embodiments.

FIG. 4 shows a method of using a compression fitting, such as compression fitting 200 or compression fitting 300. At 402, a tube is inserted through a nut with a plunger, a ferrule, and a threaded tube. In various embodiments, the tube can be a capillary column with a stationary phase coating an inner surface of at least a portion of the capillary column. In other embodiments, the tube can be a transfer line or other tubing without a stationary phase. In still other embodiments, the tube can be a packed capillary column which can be packed with stationary phase particles. In yet other embodiments, various other types of tubes can be used.

At 404, the nut and the threaded tube can be engaged. In various embodiments the nut can be finger tightened. In other embodiments, a tool can be used to tighten the nut. Coupling the nut and the threaded tube can compress and deform the ferrule forming a gas tight seal to prevent leaks.

At 406, samples can be analyzed, such as by separation in a gas chromatography system. In various embodiments, the components of the separated sample can be detected and identified, such as by using a mass spectrometer.

At 408, the nut and the threaded tube can be disengaged, and, at 410, the capillary tube can be removed from the compression coupling. In various embodiments, it may be necessary to replace or trim the capillary column. In other embodiments, the capillary tube may become clogged or broken and need to be replaced. In yet other embodiments, it may be necessary to adjust the positioning of the capillary tube.

At 412, the plunger can be used to dislodge a stuck ferrule. In various embodiments, the ferrule may become stuck to the nut and axial translation of the plunger relative to the nut can be used to force the ferrule out of the nut. In other embodiments, the ferrule may become stuck to an end of the plunger and translation of the plunger until at least a portion of the plunger head exits the nut can allow access to dislodge the ferrule from the plunger head.

At 414, the ferrule can be replaced with a new ferrule, and, returning to 402, the compression coupling can be assembled again.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A compression fitting, comprising:
   a nut with a threaded end for receiving a threaded tube and a receiving end for holding a plunger head, wherein the nut includes a spring to bias the plunger towards a proximal end of the nut; and
   a plunger with an inner bore for receiving a capillary tube and the plunger head for engaging a ferrule positioned within the receiving end between the plunger head and the threaded tube, the plunger slidingly engaged with the nut and translatable until the plunger head extends past the threaded end of the nut to force the ferrule from the nut, wherein the plunger head includes a tapered ferrule engagement surface.

2. The compression fitting of claim 1, further comprising the threaded tube.

3. The compression fitting of claim 1, wherein the threaded end of the nut is a female threaded end for receiving the threaded tube internally.

4. The compression fitting of claim 1, wherein the plunger is removable from the nut.

5. The compression fitting of claim 1, wherein the plunger includes a retaining clip or device to retain at least a portion of the plunger within the nut.

6. The compression fitting of claim 1, wherein the nut includes exterior facets for engagement with a tool for tightening and loosening the nut.

7. The compression fitting of claim 1, wherein the nut includes wings for finger-tightening the nut.

8. A method of operating a compression fitting, comprising:
   biasing a plunger towards a threaded end of a nut with a spring, the nut including the threaded end for threadingly engaging a threaded tube and a receiving end for holding a plunger head of a plunger and a ferrule compressed between the plunger head and the threaded tube, the nut further including a spring-loaded portion, the spring positioned within the spring-loaded portion;
   disengaging the nut and the threaded tube; and
   translating the plunger axially relative to the nut to dislodge the ferrule stuck within the nut or to the plunger head, wherein translating the plunger includes translating the plunger until the plunger head extends past the threaded end of the nut.

9. The method of claim 8, further comprising engaging the nut and threaded tube.

10. The method of claim 9, wherein engaging the nut and the threaded tube includes deforming the ferrule within the receiving end between the plunger head and the threaded tube to form a gas tight seal.

11. The method of claim 9, further comprising inserting a capillary tube through the plunger, nut, ferrule, and threaded tube before engaging the nut and the threaded tube.

12. The method of claim 9, wherein engaging the nut and the threaded tube includes tightening the nut with a tool.

13. The method of claim 8, wherein disengaging the nut and the threaded tube includes loosening the nut with a tool.

14. The method of claim 8, wherein translating the plunger includes removing the plunger from the nut.

15. The method of claim 8, wherein translating the plunger includes translating the plunger until a retention clip or device limits further movement of the plunger.

* * * * *